US 6,406,169 B1

United States Patent
Munsey

(10) Patent No.: US 6,406,169 B1
(45) Date of Patent: *Jun. 18, 2002

(54) TRANSLUCENT PICKUP TRUCK BED COVER

(76) Inventor: Ronald L. Munsey, 3218 Hunterwood, Missouri City, TX (US) 77459

( * ) Notice: Subject to any disclaimer, the term of this patent is extended or adjusted under 35 U.S.C. 154(b) by 0 days.

This patent is subject to a terminal disclaimer.

(21) Appl. No.: 09/656,934

(22) Filed: Sep. 7, 2000

Related U.S. Application Data

(63) Continuation-in-part of application No. 09/310,754, filed on May 13, 1999, now Pat. No. 6,116,761.
(60) Provisional application No. 60/085,939, filed on May 19, 1998.

(51) Int. Cl.$^7$ ................................................. B60Q 3/06
(52) U.S. Cl. ........................ 362/485; 362/496; 362/543
(58) Field of Search ............................... 362/485, 543, 362/496, 45, 310, 217, 544

(56) References Cited

U.S. PATENT DOCUMENTS 4,848,830 A * 7/1989 Parson ........................ 296/165

* cited by examiner

Primary Examiner—Sandra O'Shea
Assistant Examiner—Hargobind S. Sawhney
(74) Attorney, Agent, or Firm—Moser, Patterson & Sheridan, L.L.P.

(57) ABSTRACT

A pickup truck bed cover that includes a top member and a bottom member wherein either the top member or the bottom member or both are partially or wholly translucent, and wherein the top member is disposed upon the bottom member forming a space between the top member and the bottom member. The pickup truck bed cover also includes a light source disposed within the space between the top member and the bottom member, whereby the light source emits light to illuminate the translucent area of the top member or bottom member.

24 Claims, 5 Drawing Sheets

TRANSLUCENT PICKUP TRUCK BED COVER

RELATED APPLICATIONS

This is a continuation-in-part application of U.S. patent application Ser. No. 09/310,754, filed on May 13, 1999 now U.S. Pat. No. 6,116,761, entitled "Illuminating Pickup Truck Bed Cover," which application claims the benefit of U.S. Provisional Application No. 60/085,939, filed May 19, 1998. This application hereby incorporates by reference, in its entirety, U.S. patent application Ser. No. 09/310,754.

BACKGROUND OF THE INVENTION

Modern pickup trucks are typically provided with an open bed. The open bed tends to negatively affect the aerodynamics of the truck and is also inadequate to protect items stored within the bed from exposure to weather conditions, from being jarred out of the bed, and from potential theft. As a consequence, soft or hard covers are used to cover truck beds. Hard covers are typically made of fiberglass whereas soft covers are typically made of vinyl. However typical covers are often aesthetically displeasing and are difficult to decorate.

SUMMARY OF THE INVENTION

This invention is broadly directed to a pickup truck bed cover, also referred to as a "lid" or "tonneau cover," which protects the bed of a pickup truck and its contents from external forces or weather conditions, including rain, snow, hail, and wind. Preferably, the invention relates to translucent pickup truck bed covers. The invention also preferably relates to a pickup truck bed cover that illuminates color in the dark.

In a specific embodiment, the cover includes a flat hollow member with at least an upper and a lower flat portion defining a space within the member wherein at least a portion of either the upper or lower flat portions (preferably just the upper portion) includes a translucent material; and a light source disposed within the space, such that the light source is capable of emitting light through the translucent material.

In a specific embodiment, this invention is also directed to a pickup truck bed cover, that includes a top member and a bottom member. Either the top member or the bottom member (or both) is partially or wholly translucent. The top member is preferably disposed upon the bottom member to form a space between the top member and the bottom member. A light source is preferably disposed within the space between the top member and the bottom member, whereby the light source emits light through the translucent areas of either the top member or the bottom member (or both).

BRIEF DESCRIPTION OF THE DRAWINGS

FIG. 9b is a cross-sectional view of the cover of FIG. 9a.

FIG. 9c is a cross-sectional view of the top member of the cover of FIG. 9a.

DETAILED DESCRIPTION OF THE INVENTION

While the invention will be described in connection with preferred embodiments, it will be understood that it is not intended to limit the invention to those embodiments. On the contrary, the invention is intended to cover all alternatives, modifications, and equivalents as may be included within the spirit and scope of the invention as defined by the appended claims.

"Opaque" as used herein is defined as describing a body through which no light in the visible spectrum can pass through.

"Thermoforming plastic" as used herein is defined as any plastic capable of being heated and then molded to a desired shape.

"Thermosetting plastic" as used herein is defined as any plastic that is cured or crosslinked upon heating.

"Translucent" as used herein is defined as describing a body through which at least some light in the visible spectrum can pass through.

"Transparent" as used herein is defined as describing a body through which substantially all light in the visible spectrum can pass through.

Figure 1:
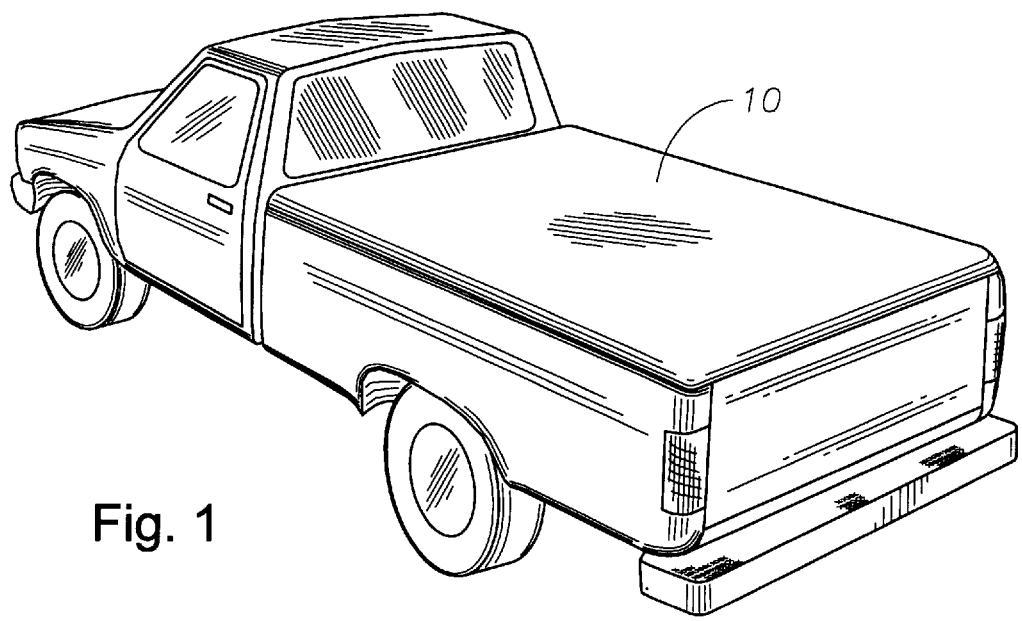
FIG. 1 shows a side perspective view of a pickup truck with a cover of a specific embodiment of the present invention in a closed position.
Figures 2, 3:
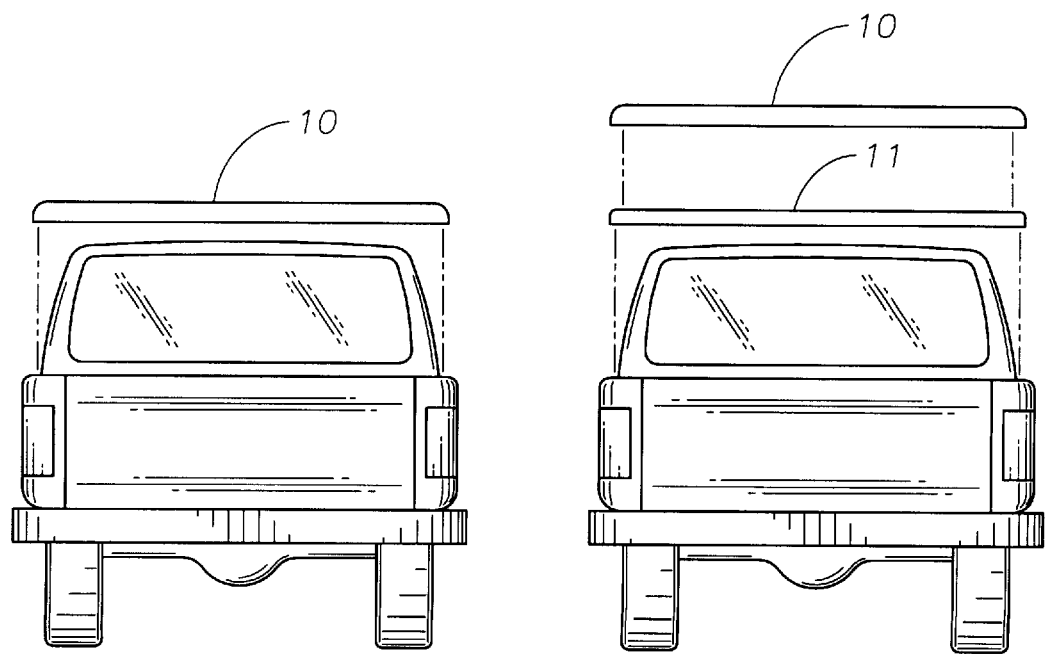
FIG. 2 shows a rear view of a pickup truck bed with one embodiment of a cover of the present invention disposed directly on the truck.
FIG. 3 shows a rear view of a pickup truck bed with another embodiment of a cover of the present invention disposed on a conventional truck cover.

As shown in FIG. 1, the cover 10 is generally designed to cover a bed of a pickup truck, but is also suitable for other vehicles. The cover 10 may be used individually by placing it on the walls of a pickup truck bed (as shown in FIG. 2) or in combination with a conventional truck bed cover 11 by placing it on top of a conventional cover 11 (as shown in FIG. 3).

The pickup bed cover in FIG. 1 includes a cover member and a light source positioned adjacent the bottom surface of the cover member. The cover member is partially or wholly translucent so that at least a portion of the light from the light source is permitted to pass or shine through the translucent area of the cover member. The light source therefore provides an illuminating or "glowing" effect to the cover member. In addition, the cover member may be made of any color and/or the light source may provide any color (e.g. a tinted bulb) to the cover member so that the cover member can be illuminated to any desired color or combination of colors. Furthermore, the translucent area may also form a pattern (e.g., stripes, stars, or names) so that the illuminated area is in any desired shape or design. Therefore, the cover of FIG. 1 not only serves to cover the bed of the pickup truck, thus protecting the contents from theft or the weather, but is also aesthetically pleasing, by virtue of the glow given off by the light source.

Figure 4:
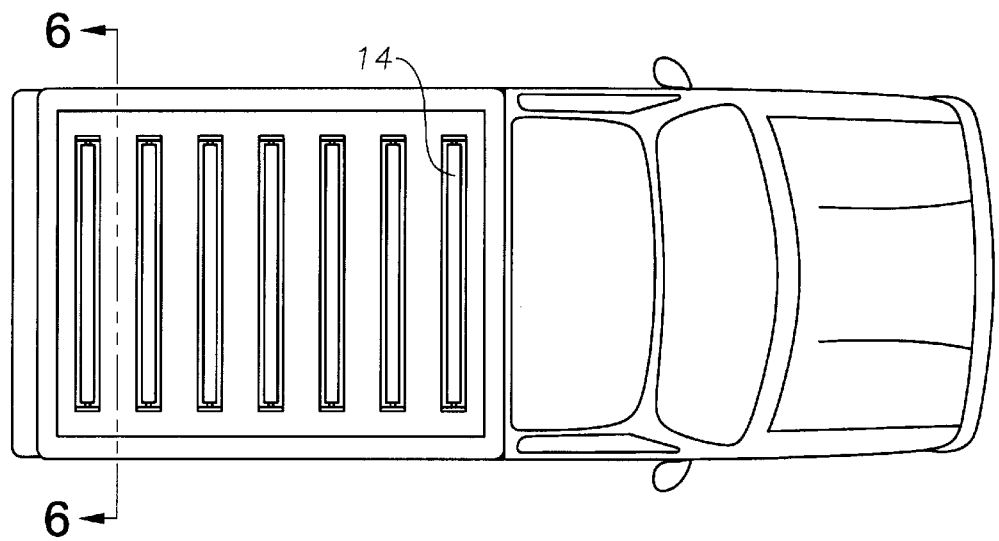
FIG. 4 shows a top plan view of one example of a light source positioned with respect to the pickup truck bed.
Figure 5:
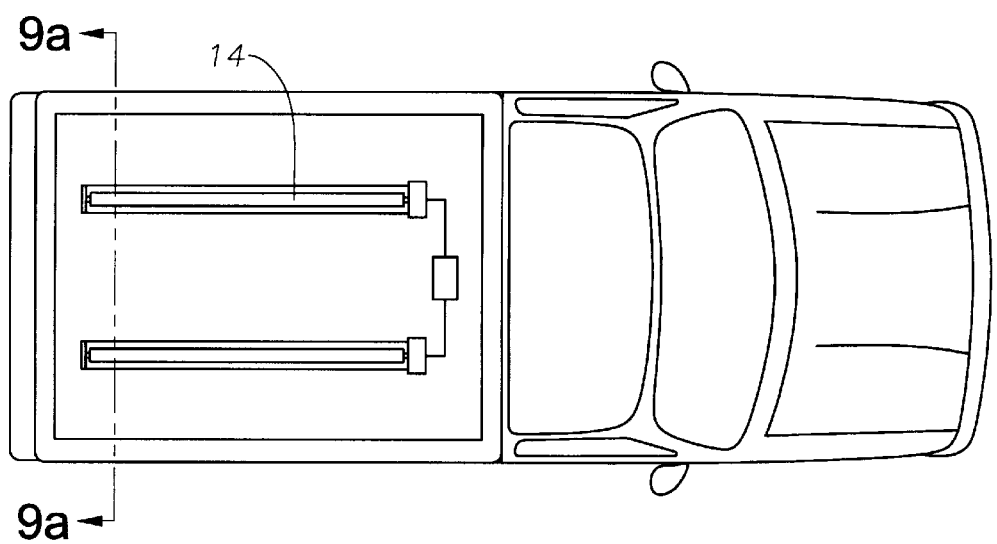
FIG. 5 shows a top plan view of another example of a light source positioned with respect to the pickup truck bed.

FIG. 4 is a top plan view of a specific embodiment of the light source 14, which may include fluorescent tubes. However, the light source 14 can be any type of light or combination of lights which includes, but is not limited to, incandescent bulbs, halogen bulbs, neon lamps, and light-emitting diodes. The light source 14 may be disposed in any position and orientation in the cover. For example, the fluorescent tubes may be disposed perpendicular to the length of the truck bed as shown in FIG. 4, parallel to the length of the truck bed as shown in FIG. 5, or in any position.

Figure 6:
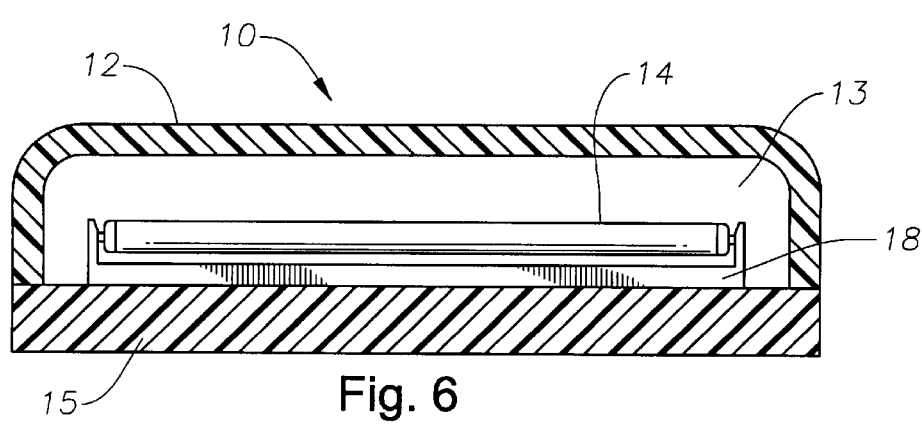
FIG. 6 shows a cross-sectional view of the cover of FIG. 4.
Figure 7:
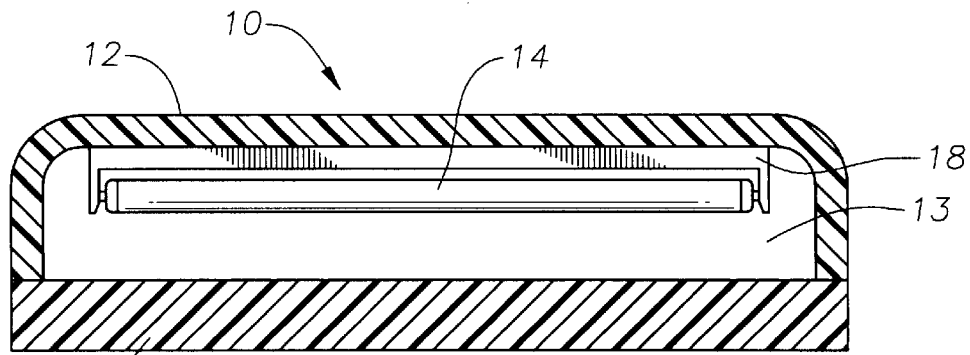
FIG. 7 shows a cross-sectional view of another embodiment of the cover.
Figure 8:
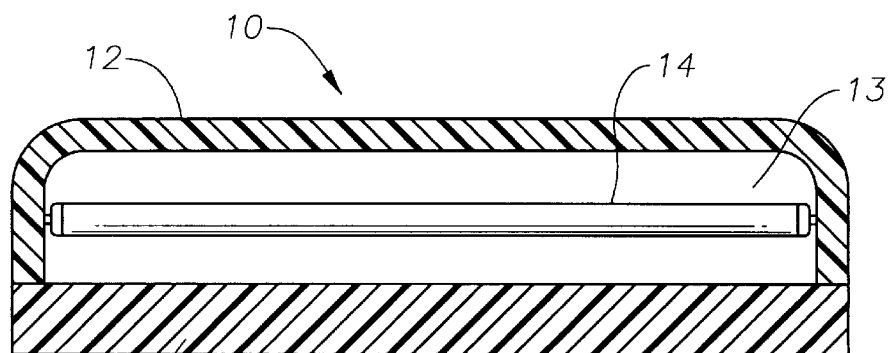
FIG. 8 shows a cross-sectional view of a further embodiment of the cover.

Referring to a specific embodiment shown in FIG. 6, the truck bed cover 10 includes a top member 12 and a bottom member 15 which forms a lighting space 13. The light source 14 is disposed within the space 13 on a light support 18. The top member 12 is partially or wholly translucent so that at least a portion of the light from the light source 14 is permitted to pass or shine through the translucent area of the top member 12. The light support 18 holds the light source 14 in the space 13 and provides electrical connections to the light source 14. The dimensions, position, and function of the light supports 18 depend on the type of light source used. For example, if fluorescent tubes are used as the light source 14, the light supports 18 may be fastened, with preferably fasteners or epoxies/adhesives, to the bottom member 15 (as shown in FIG. 6), to the top member 12 (as shown in FIG. 7), to the sides of the top member 12 (as shown in FIG. 8), or to any member of the cover or truck. In addition, the light supports may also include at least one electrical socket for each light source. In one embodiment, a single socket is provided for each fluorescent bulb (as shown in FIG. 5) in order to provide ease of installation and replacement of the fluorescent bulbs.

In general, electrical current may be supplied to the light source 14 by fashioning wire (not shown) from the cover 10 to the electrical supply of the truck, e.g. from the truck battery. For example, a hole may be drilled from the truck bed to the truck cabin so that wire may be fashioned between the cover 10 and the electrical circuitry in the truck cabin. In addition, a wire may be connected to an electrical outlet which may be provided near the tailgate of some trucks. Alternatively, electrical current may be supplied to the cover from a separate battery (not shown) connected to the light source 14. If fluorescent lamps are used, the light supports also must include a ballast to stabilize the current. The ballast is preferably located in the cover 10 but may also be located in the truck bed itself or even in the truck cabin.

Preferably, once the power is turned on or activated, the light source 14 will shine light up through the translucent top member 12, illuminating the entire outer surface of the top member 12. In one embodiment, the translucency of the top member and/or the brightness of the light source 14 may be tailored so that the light source 14 cannot be visually perceived from the outside. In other words, the surface of the top member 12 illuminates as a whole and not just as an outline of the light source 14. In another embodiment, to avoid violating Department of Transportation regulations, the illuminated surface is not visible from one side of the truck (e.g., the rear), or optionally is not visible from all sides of the truck. Thus, the sides of the lid are preferably not translucent, or may be covered by opaque material. Alternatively, the top member may include a lip around all or part of its upper surface so that the illuminated surface is not visible from other vehicles.

Figure 9A:
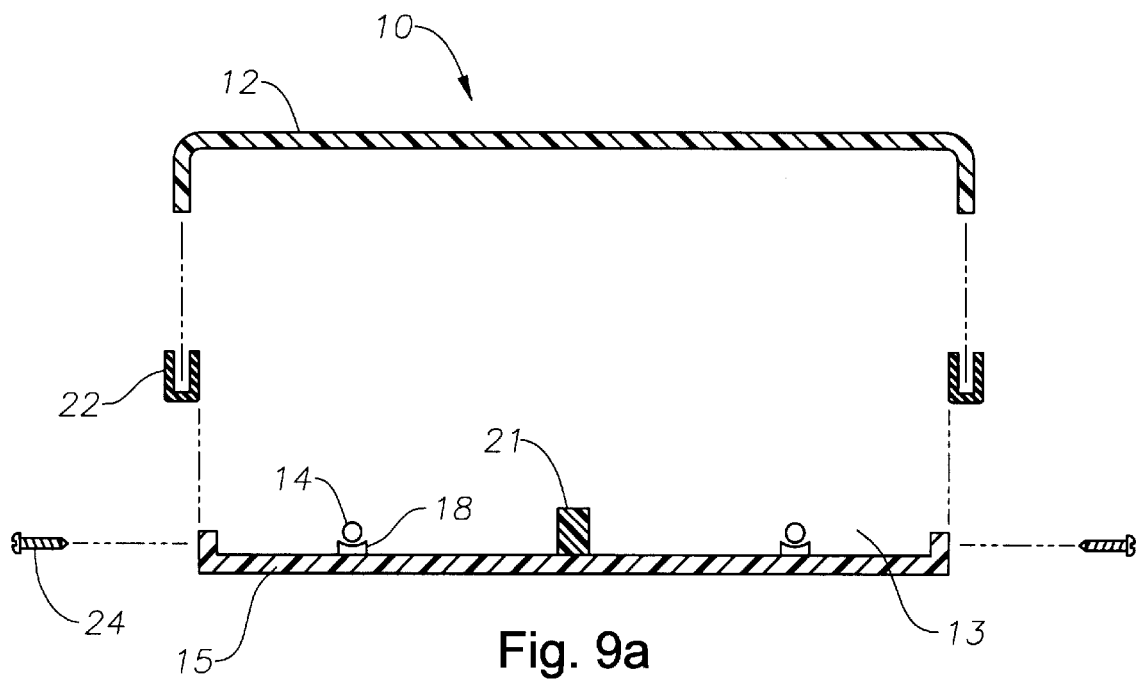
FIG. 9a is an exploded cross-sectional view of the cover of FIG. 5.
Figure 9B:
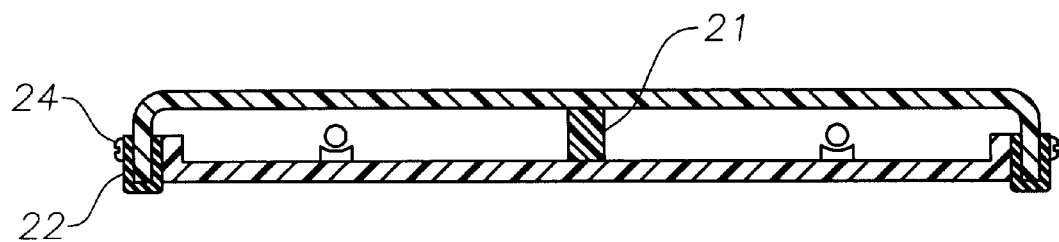
Figure 9C:
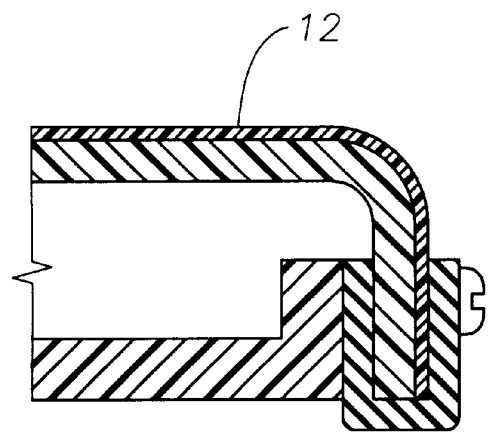

In general, the top member 12 is made from at least one layer of material and preferably from at least two layers of material (as shown in FIG. 9c). The material for the top member 12 may be any suitable engineering material which is at least partially translucent and which includes but is not limited to polymers, polymer blends, fiberglass, and combinations thereof. The polymer may be any suitable plastic which preferably is polycarbonate, acrylic, or styrene-acrylonitrile but may also include, but is not limited to, polyethylenes, polyvinyl chlorides, polypropylenes, polyethylene terephthalates, polyurethanes, phenolics, melamine-formaldehydes, ureafonnaldehydes, polyesters, other thermoforming plastics, other thermosetting plastics, and blends thereof. Furthermore, the material can also include one or more additives which include, but is not limited to, UV stabilizers, flame retardants, pigments, gloss agents, and antioxidants. Preferably, the top member is made of polymer rather than of fiberglass because polymer is lighter that fiberglass and more readily available in translucent form than fiberglass.

In one embodiment, the top member 12 is made from a top layer and a bottom layer in which the top layer has a higher impact resistance than the bottom layer in order to provide a top member 12 which resists chipping and cracking. For example, the top member preferably includes a polycarbonate bottom layer and an acrylic top layer. In another embodiment, the top member 12 is made from pigmented lower layer and an UV resistant top layer which prevents the color of the lower pigmented layer from dulling. For example, the top member may include a polycarbonate pigment bottom layer and a top layer of a thin acrylic UV resistant film. It is understood that the above described embodiments may also include covers made of three or more layers.

If two or more layers are used, the layers are typically concurrently co-extruded or laminated together to form one flat sheet. In a specific embodiment, the top member 12 has a thickness from about 0.375 to 0.50 inches. The flat sheet should be formed to a desired shape by a thermoforming process. In The thermoforming process, the sheet may be heated to its softening point. Then, the perimeter of the sheet may be clamped down and the sheet may be draped over a male or a female plug/mold in the shape of the finished product. Alternatively, both a male and a female plug may be used. A vacuum and/or pressure may then be applied to pull and/or push the sheet around the plug. Once the sheet has been impelled tight around the plug, the formed product should be cooled. The outer perimeter of the product may then be trimmed by routers, water jet cutters, steel rule dies, or other methods to remove the scrap. The resultant top member should then be ready for drilling, tapping, or other assembly steps.

FIG. 9a is an exploded cross-sectional view of the assembly of one embodiment of the cover 10. To assemble the cover 10, the top member 12 may be attached to the bottom member 15 in any conventional manner, preferably with fasteners (e.g., screws, bolts, pins, snaps or buttons) or epoxy/adhesive. The bottom member 15 is preferably made of a metal sheet, but instead may also be made of any material or coated with a fiberglass or polymer material. A support structure 21 may be attached or formed to the bottom member 15 or the top member 12 in order to add structural rigidity to the cover 10 and to protect the light source 14 from being damaged. Here, weather strapping 22 is disposed on the bottom edge of the cover 10 in order to protect the walls of the truck bed when it comes into contact with the cover 10 and to create a barrier to prevent moisture from entering the truck bed when the cover is closed. A portion of the weather stripping 22 may also be disposed between the top member 12 and the bottom member 15 to prevent moisture from entering the lighting space 13. Preferably, screws 24 are used to attach the top member 12 to the bottom member 15. In one embodiment, a portion of the weather stripping 22 protrudes up from the edge of the top member 12 so that the screws 24 may be inserted through the weather stripping and thus hidden by the weather stripping 22. Alternatively or additionally, the weather stripping may be attached with an adhesive. In a specific embodiment, the exterior thickness of the truck bed cover 10 measured from the outer edge of the top member to the outer edge of the bottom member should be about 2.5 inches to about 3.0 inches.

Figure 10:
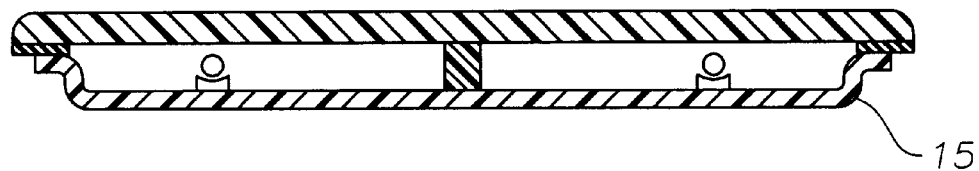
FIG. 10 is a cross-sectional view of another embodiment of the cover.
Figure 11A:
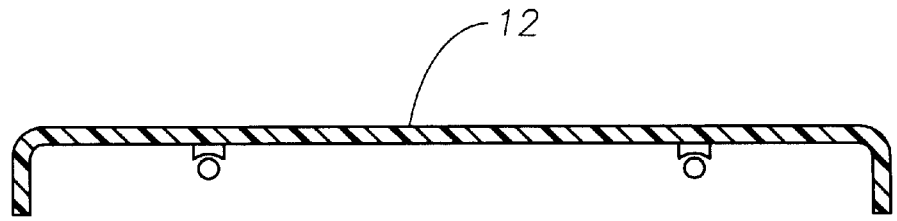
FIG. 11a is a cross-sectional view of a cover without a bottom member.
Figure 11B:
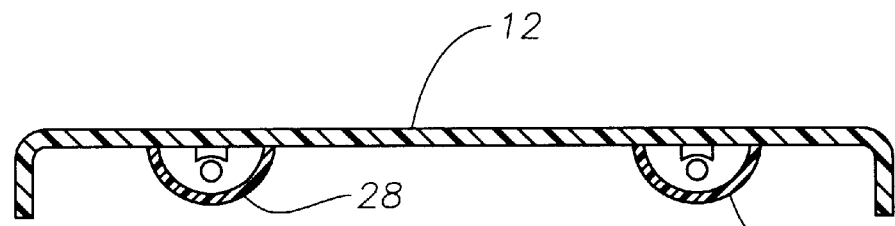
FIG. 11b is a cross-section view of another embodiment of a cover without a bottom member.

As can be seen, many different embodiments of the cover 10 are possible. As shown in FIGS. 6–9, the top member forms the sidewalls of the lighting space 13. However, the lighting space may be formed by any structure. For example, the bottom member can form the sidewalls (as shown in FIG. 10) or additional members can form the sidewalls (not shown). In addition, as shown in FIG. 11*a*, the invention includes other embodiments of the cover in which the cover does not have a bottom member and the light source is not enclosed within an enclosed space. Furthermore, as shown in FIG. 11*b*, the cover may have protective shells 28 over the light source 14 instead of having a bottom member.

Figure 12:
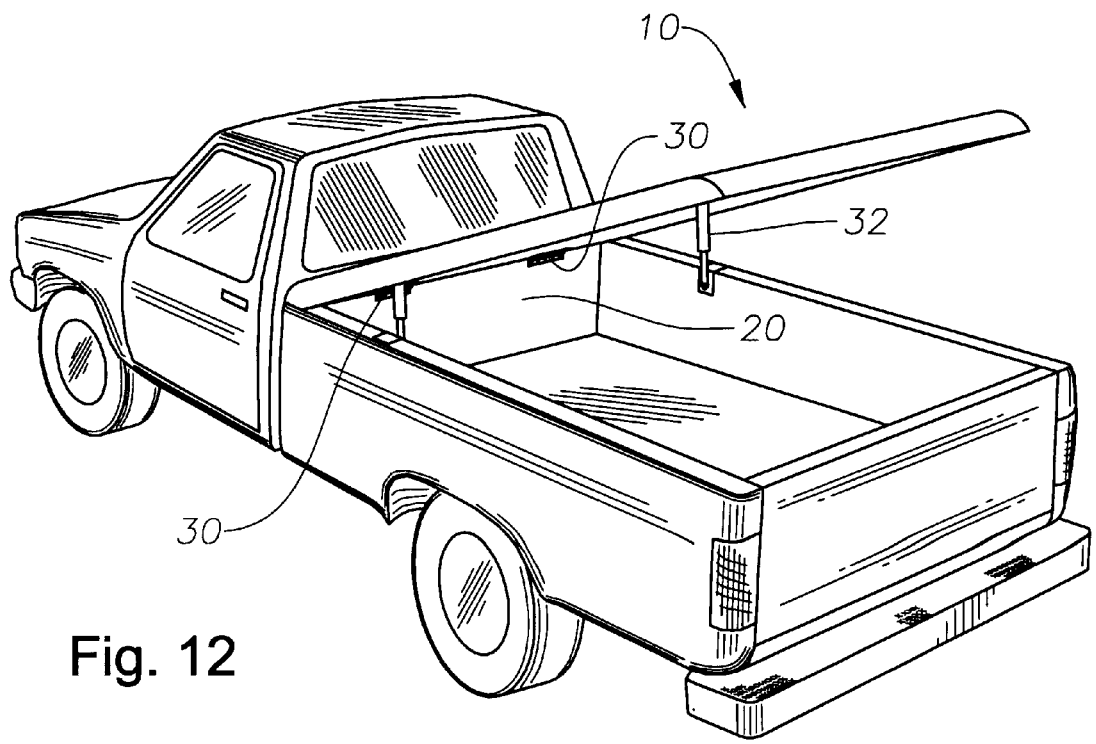
FIG. 12 is a rear perspective view of the truck having a bed cover in an open position.

As shown in FIG. 12, the front edge of truck bed cover 10 is connected to the front sidewall 20 of the truck bed by a hinge 30, enabling the truck bed cover 10 to be easily opened and closed. The cover 10 can further include rods, arms, or struts 32, which are connected between the cover and the truck bed to aid in opening and support the truck bed cover in an open position. The cover and the struts may be attached to the truck bed by utilizing clamps, mounting rails, screws, fasteners, adhesives, hooks, or any other conventional devices. Furthermore, the cover 10 may be sized to hang over the sidewalls of the truck bed or to mount flush with the sidewalls. The truck bed cover 10 may also include a lock (not shown) to prevent the cover from being opened.

It is noted that this invention is to be defined by the claims, including the elements recited in those claims and their substantial equivalents. Accordingly, the invention is by no means limited to the truck bed covers described in connection with the specific embodiments of this invention, and particularly is not limited to the structure shown in the drawings.

What is claimed is:

1. A cover for a bed of a truck, comprising:
    (a) a cover assembly comprising at least one cover member made of a material selected from the group consisting of polymers, polymer blends, fiberglass, or combinations thereof, wherein the cover member is substantially flat and rectangular and has a top surface, a bottom surface, a translucent area extending from the top surface to the bottom surface;
    (b) a light source positioned adjacent the bottom surface of the cover member, wherein the light source is capable of emitting light through the translucent area of the cover member; and
    (c) means for attaching the cover assembly to the truck.
2. The cover of claim 1, wherein the entire cover member is translucent.

3. The cover of claim 1, wherein the cover member comprises at least two coplanar layers in contact with one another, each layer comprising a material selected form the group consisting of polymers, polymer blends, fiberglass, or combinations thereof.

4. The cover of claim 3, wherein the cover member comprises a top layer and a bottom layer, the top layer having a higher impact resistance than the bottom layer.

5. The cover of claim 1, wherein the cover member includes a polymer selected from the group consisting of polycarbonates, acrylics, styrene-acrylonitriles, polyethylenes, polyvinyl chlorides, polypropylenes, polyethylene terephthalates, polyurethanes, phenolics, melamine-formaldehydes, urea-formaldehydes, and polyesters.

6. The cover of claim 1, wherein the cover member includes pigment in an amount sufficient to provide a non-white color to the cover member.

7. The cover of claim 1, wherein the light source emits light of a non-white color.

8. The cover of claim 1, wherein the cover member material contains one or more additives selected from the group consisting of UV stabilizers, flame retardants, pigments, gloss agents, and antioxidants.

9. The cover of claim 1, wherein the cover assembly includes a bottom edge for contact with the truck bed, further comprising weather stripping attached along at least a portion of the bottom edge of the cover assembly.

10. The cover of claim 1, further comprising one or more hinge assemblies attached to the cover assembly and adapted to allow the cover assembly to swing into an open position.

11. The cover of claim 10, further comprising at least two struts coupled between the cover assembly and the truck.

12. The cover of claim 1, further comprising at least one socket for receiving the light source, wherein the socket is disposed at one end of the cover assembly.

13. The cover of claim 1, wherein the cover assembly is adapted to be attached on top of another cover on the truck.

14. A cover for a truck, comprising:
    (a) a cover assembly operably attached to the truck and comprising at least one substantially flat top member and at least one substantially flat bottom member, wherein the top member comprises a material selected from the group consisting of polymers, polymer blends, fiberglass, or combinations thereof, the top member being partially or wholly translucent and being disposed in a substantially coplanar relation to the bottom member to provide a space between the top member and the bottom member;
    (b) a light source disposed within the space between the top member and the bottom member, the light source being capable of emitting light through the top member.

15. The cover of claim 14, further comprising weather stripping disposed between the top member and the bottom member.

16. The cover of claim 14, wherein the bottom member is opaque.

17. A cover for attaching to a pickup truck bed, comprising:
    (a) a light housing comprising at least one cover member being partially or wholly translucent, wherein the cover member has a top surface and a bottom surface;
    (b) a light source positioned adjacent the bottom surface of the member, wherein the light source is capable of emitting light to illuminate through the cover member; and
    (c) means for attaching the light housing to the truck.

18. The light assembly of claim 17, wherein the light housing is no more than about 3 inches in height.

19. The light assembly of claim 17, wherein the light assembly is adapted to at least partially cover a pickup truck bed.

20. A method of manufacturing a pickup truck bed attachment, comprising:
  (a) forming at least one partially or wholly translucent member, wherein the member is sized to at least partially cover the pickup truck bed; and
  (b) disposing a light source below the member.

21. The method of claim 20, wherein the member comprises a thermoplastic or a thermosetting plastic.

22. The method of claim 20, wherein forming the translucent member comprises thermoforming a substantially flat member made of a polymer material.

23. The process of claim 22, wherein thermoforming comprises extruding a layer of material over a mold.

24. The process of claim 23, wherein at least two layers of material are co-extruded over the mold.

* * * * *

UNITED STATES PATENT AND TRADEMARK OFFICE
CERTIFICATE OF CORRECTION

PATENT NO. : 6,406,169 B1  Page 1 of 1
DATED : June 18, 2002
INVENTOR(S) : Ronald L. Munsey It is certified that error appears in the above-identified patent and that said Letters Patent is hereby corrected as shown below:

Column 4,
Line 15, please change "ureafonnaldehydes" to -- urea-formaldehydes --.
Line 67, please change "weather strapping" to -- weather stripping --.

Signed and Sealed this

Twenty-seventh Day of August, 2002

Attest:

JAMES E. ROGAN
Attesting Officer  Director of the United States Patent and Trademark Office